(12) United States Patent
Lin

(10) Patent No.: US 7,063,046 B1
(45) Date of Patent: Jun. 20, 2006

(54) HYGIENIC PET CONSERVATIVE BAND

(76) Inventor: Rong-Hui Lin, 3 Fl.-3, No 128,Jianmin Rd., Lingya District ,Kaohsiung City (TW)

( * ) Notice: Subject to any disclaimer, the term of this patent is extended or adjusted under 35 U.S.C. 154(b) by 0 days.

(21) Appl. No.: 11/057,784

(22) Filed: Feb. 15, 2005

(51) Int. Cl.
*A01K 21/00* (2006.01)

(52) U.S. Cl. ........................ 119/854; 119/868

(58) Field of Classification Search ............... 119/850, 119/854, 867, 868, 869; 604/327, 355, 317
See application file for complete search history.

(56) References Cited

U.S. PATENT DOCUMENTS

| | | | | |
|---|---|---|---|---|
| 4,290,386 A | * | 9/1981 | Eiriksson | 119/868 |
| 4,510,887 A | * | 4/1985 | Lincoln et al. | 119/868 |
| 4,577,591 A | * | 3/1986 | Wesseldine | 604/391 |
| 4,779,573 A | * | 10/1988 | Vidal | 119/868 |
| 4,969,419 A | * | 11/1990 | Fong | 119/868 |
| 5,355,836 A | * | 10/1994 | Vallery | 119/868 |
| 5,937,795 A | * | 8/1999 | Raphael | 119/869 |
| 6,363,697 B1 | * | 4/2002 | Shapiro | 54/23 |
| 6,368,313 B1 | * | 4/2002 | Howard | 604/385.09 |
| 6,837,187 B1 | * | 1/2005 | Berardo | 119/792 |

* cited by examiner

*Primary Examiner*—T. Nguyen
(74) *Attorney, Agent, or Firm*—Troxell Law Office, PLLC

(57) ABSTRACT

A hygienic pet conservative band includes a patch, a lengthwise band and two lateral bands. The patch covers on the waist and the bottom of a pet, and the lengthwise band is connected with the patch and the two lateral bands are connected laterally with the lengthwise band, Then the pet band can be worn on the body of a pet, with the patch completely hiding the sexual organ of a pet, not liable to loosen off in spite of movement of the pet and preventing the pet from being coupled undesirably to get pregnant, also having good ventilation.

7 Claims, 8 Drawing Sheets

HYGIENIC PET CONSERVATIVE BAND

BACKGROUND OF THE INVENTION

1. Field of the Invention

This invention relates to a hygienic pet conservative band, particularly to one preventing a pet from undesirable sexual coupling and getting pregnant, easily worn and taken off for convenience of any activities, also having good ventilation for a pet.

2. Description of the Prior Art

Mankind is the most intellectual of all, the population has grown excessively large for the limited resources in the whole world, and we have developed an idea that we have to control our population for avoiding too intensive competition among persons and countries, by means of various methods of contraception.

In this 21-century, some kinds of animals have been on the verge of extinction by oversized development of the human civilization of intruding into natural habitats of animals in mountains, rain forests, etc. Some reasons of the endangered animals come from human appetite for devouring rare meats of them. However, we have awakened to this hard fact, so not a few countries have established animal protective laws for the endangered. Only dogs are fortunate, deeply cared and loved by many people, becoming dear pets, or an essential part of our life. But sometimes pets may be deserted by owners to stray around to become wild dogs not cared to pollute our environment severely. So some protective bands for dogs have been used for pet dogs.

As one of such means, a conventional protective pants is shown in FIGS. 1 and 2 respectively showing a perspective view of the conventional protective pants and a perspective view of the pants worn on a pet. The conventional protective pants 1 includes a tail hole 12 in an upper portion, a large and a small hole 13 and 14 below the tail hole 12, a plurality of projecting thorns 15 in the portion around the two holes 13, 14, and an electric shocking member 16 respectively provided at two sides. Further a flat switch 17 is provided on an upper front portion of the pants 1, powering the electric shocking member 16 to generate high-voltage and low current, with a battery 18 stored at front upper portion of the pants 1 for supplying the power.

However, the conventional protective pet pants 1 is only worn on the waist and the bottom of a pet, prone to fall off owing to the body movements in various activities of the pet, needing frequent care of wearing it on the pet by an owner. Further, the projecting thorns 15 may cause the pet to feel uncomfortable in case of squatting down. In spite of the electric shocking member 16, it can accidentally touch wet places to cause electric short-circuits to receive electric shock on its own body.

Next, a conventional pet anti-coupling device is shown in FIGS. 3, 4 and 5 respectively showing a perspective view, a perspective view of its used condition and a perspective view of it worn on a pet body. The pet anti-coupling device includes a thin body 11, which has a hole 12 in a left portion and many ventilating small holes 13 in a lower portion of the hole 12, and two elongate bands 14 and 15 extending to the right side from the two sides of the thin body 11. The two elongate bands 14 and 15 respectively have a fastener 16—one male fastener 160 and a female fastener 161—at the outer end to fasten together after binding around the belly of a pet. Further, a position band 18 is provided to extend to the left from the left side of the thin body 11, and a buckle 18 is placed on the position band 17 for adjusting the length of the position band 17.

But the conventional pet anti-coupling device can only be worn on the waist and the bottom of a pet, liable to loosen and fall off during moving or biting with other pets, obliging the owner to wear it on the pet again and again.

SUMMARY OF THE INVENTION

The inventin has an objective to offer a hygienic pet conservative band possible to prevent undesirable coupling of a pet with other same kind and to be worn on the body of a pet with ease, not loosening off in spite of movement of the pet with good ventilation.

The hygienic pet conservative band includes a patch, a lengthwise band and two lateral bands. The patch has a proper shape to cover on the waist and the bottom of a pet, and a hole formed in an upper end, and a string fixed around the hole and attached with an adjusting member. The patch has its front end and its rear end connected with the lengthwise band, and the two lateral bands are connected crossingly with the lengthwise band with a spaced distance. A V-shaped connective string is connected with the intermediate point of the outer lateral band with a hook attached at the two ends of the connective string for hooking with a collar of the pet for helping to secure the pet band on the body of the pet. After the hygienic pet conservative band is worn on a pet, it can prevent the pet from being coupled undesirably by other same kind to avoid pregnancy, also having easy wearing and good ventilation.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
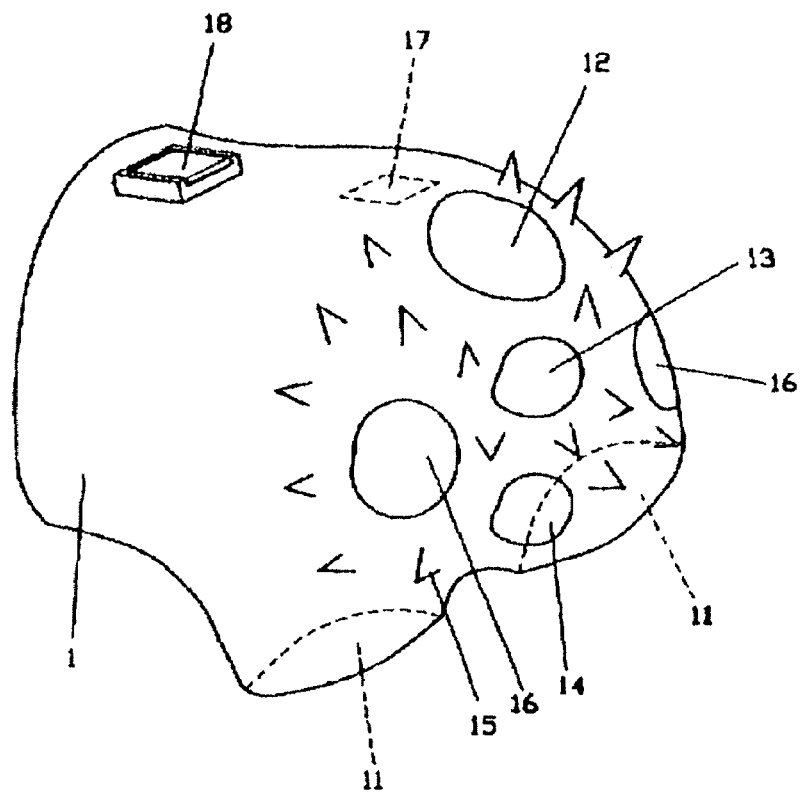
FIG. 1 is a perspective view of a conventional protective pet pants.
Figure 2:
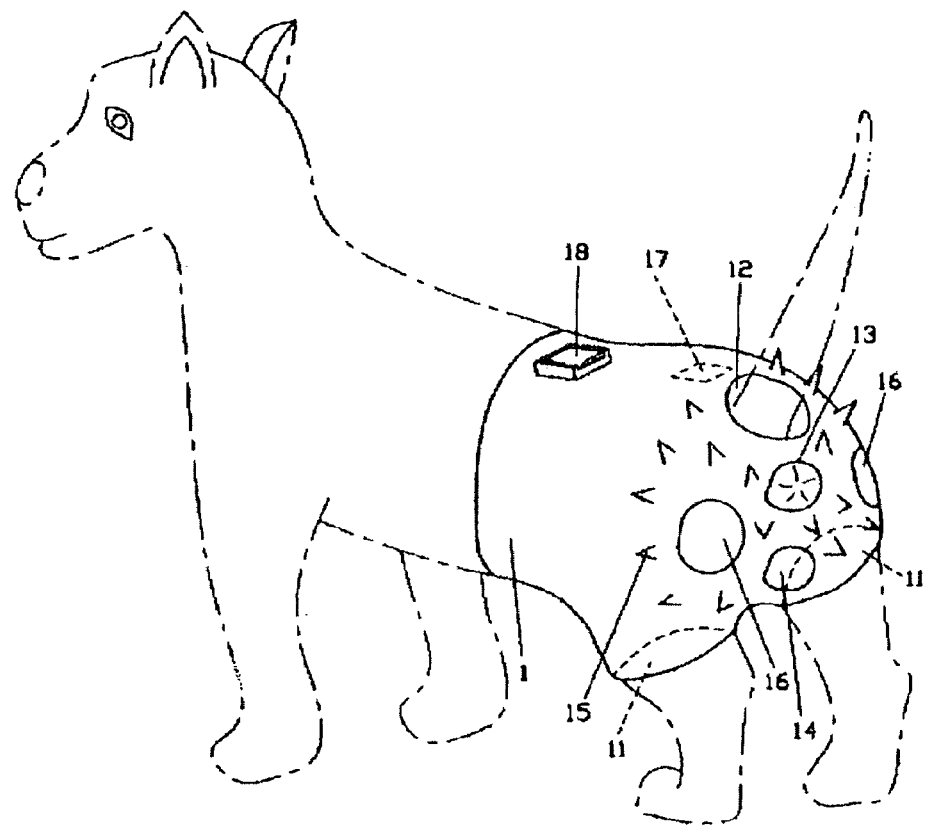
FIG. 2 is a perspective view of the conventional protective pet pants worn on a pet.
Figure 3:
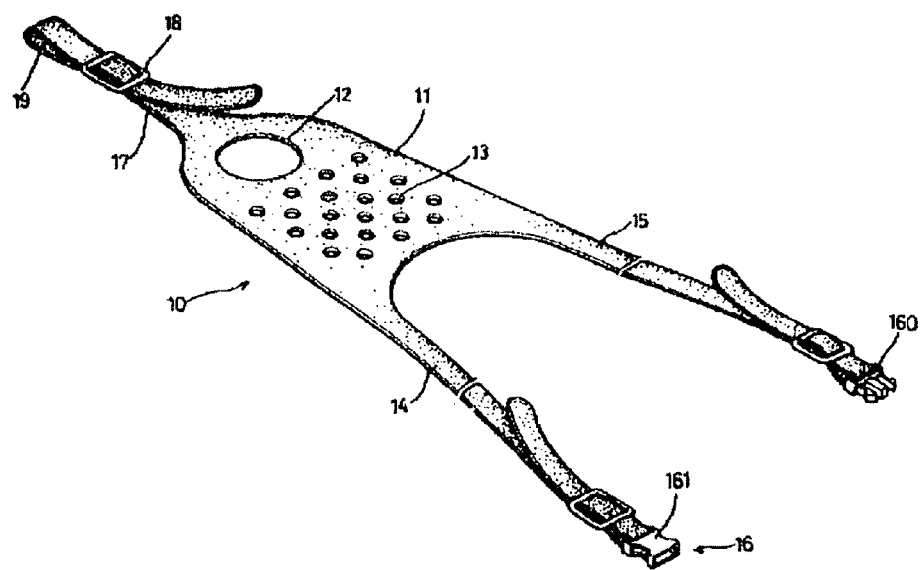
FIG. 3 is a perspective view of a conventional pet anti-coupling band in a not-combined condition.
Figure 4:
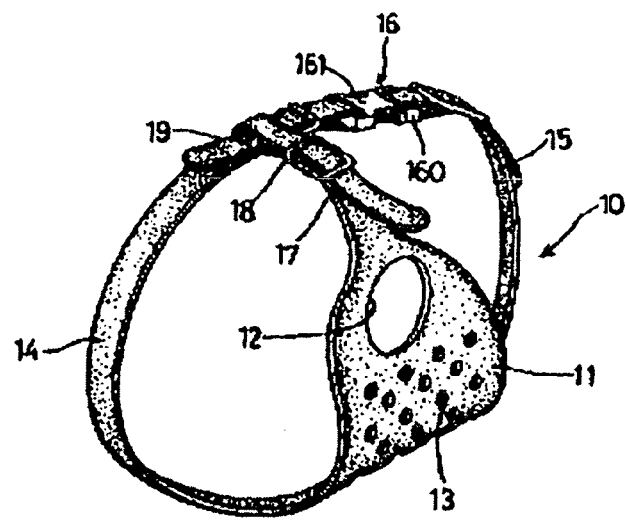
FIG. 4 is a perspective view of the conventional pet anti-coupling band combined together.
Figure 5:
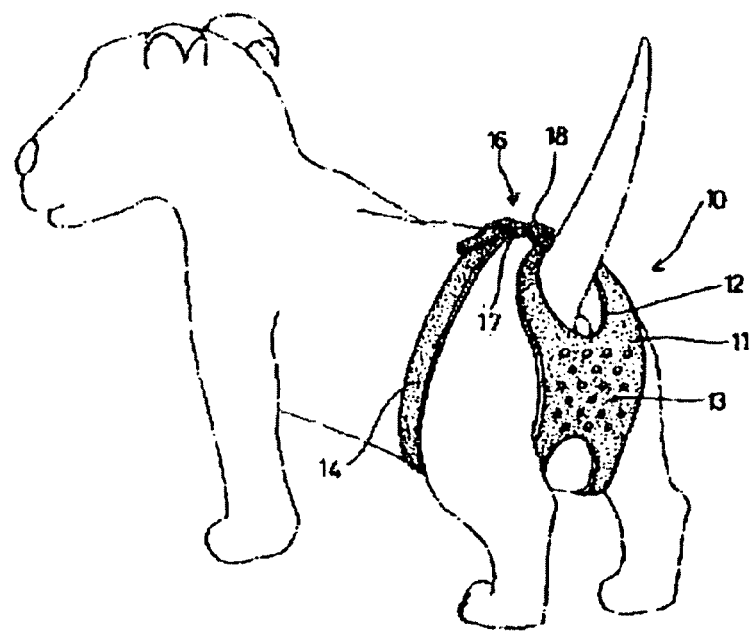
FIG. 5 is a perspective view of the conventional pet anti-coupling band worn on a pet.
Figure 6:
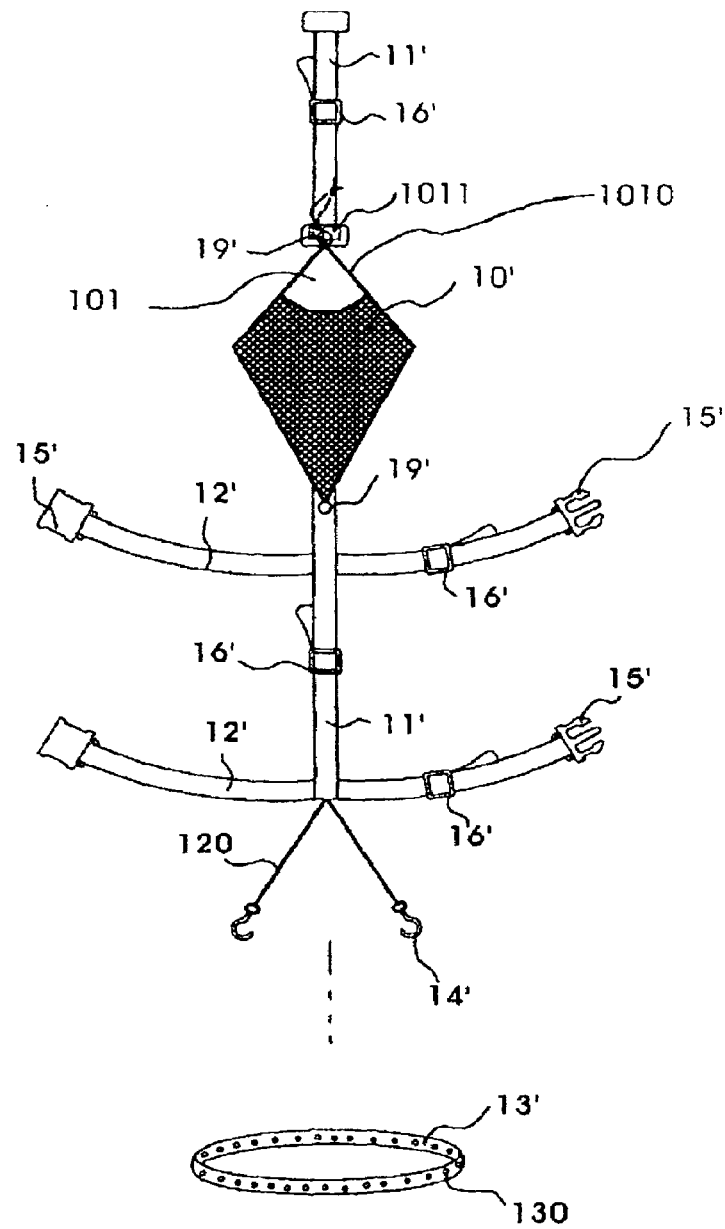
FIG. 6 is a perspective view of a hygiene pet conservative band in a not-combined condition in the present invention.
Figure 7:
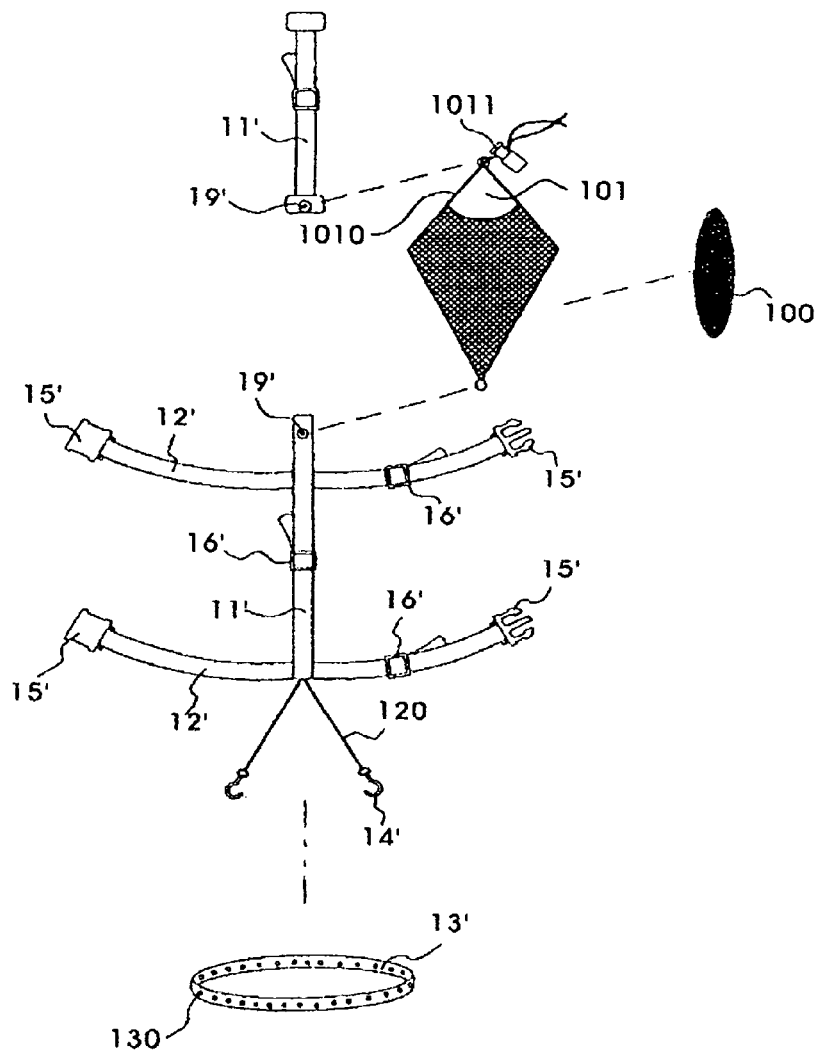
FIG. 7 is an exploded perspective view of the hygiene pet conservative band in the present invention.
Figure 8:
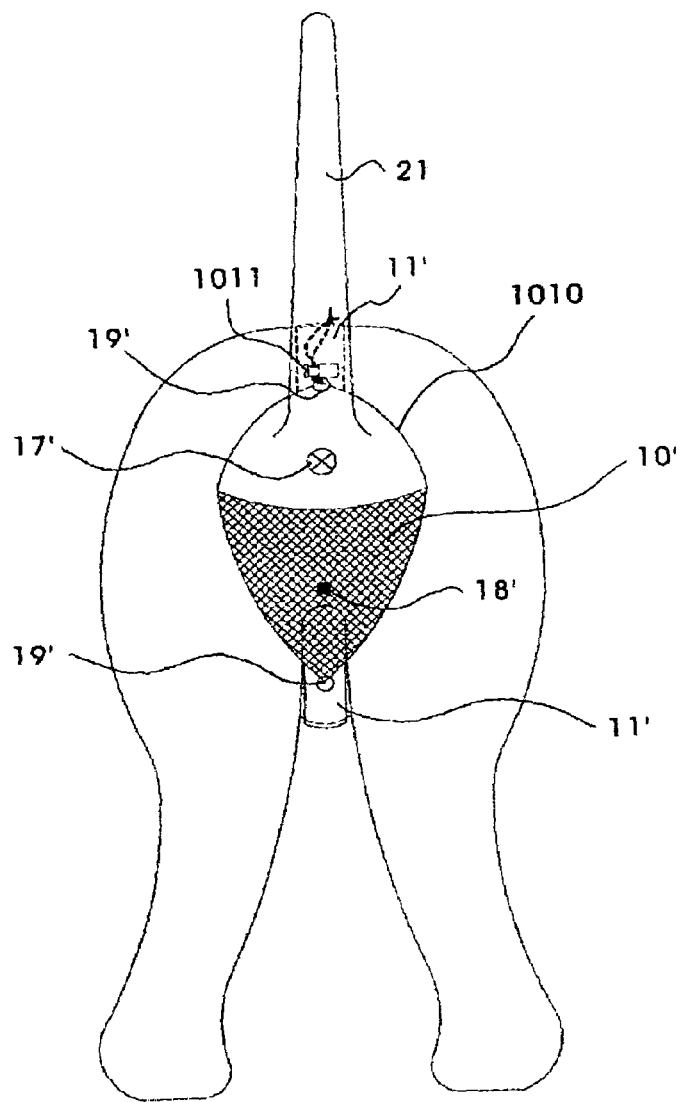
FIG. 8 is a rear view of the hygiene pet conservative band worn on a pet in the present invention; and, FIG. 9 is a side view of the hygiene pet conservative band worn on a pet in the present invention.
Figure 9:
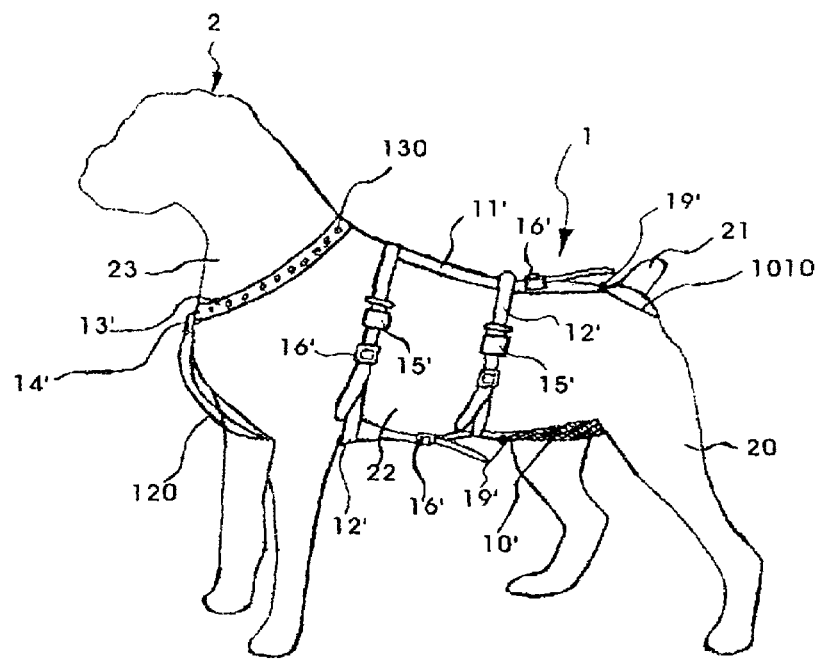

A preferred embodiment of a hygienic pet conservative band in the present invention, as shown in FIGS. 6, 7, 8 and 9 includes a patch 10', a lengthwise band 11' and two lateral bands 12' as main components. FIG. 6 shows a perspective view of the hygienic pet conservative band, FIG. 7 an explode perspective view of the hygienic conservative band, FIG. 8 a rear view of the hygienic pet conservative band worn on a pet, and FIG. 9 a side view of hygienic pet conservative band.

The patch 10' is shaped to suit to the waist and the bottom of a pet (dog) 2, can be a sheet of cloth or a net, or pants-shaped. Further the patch 10' has a connective member 19' at a front end and a rear end to combine collapsibly with the lengthwise band 11' and a cotton member 100 can be placed on the inside of the patch 10' to cover the sexual organ 19' of a pet when the pet is just in its menses cycle, for absorbing what the pet 2 secretes. Then the cotton member 100 is to be placed in and replaced with new one in due time for keeping clean the body of the pet by washing if needed. Further, the cotton member 100 can be made of material having low friction coefficient, or ventilating net-shaped material. The patch 10' is provided with a hole 101 in an upper end for the tail of the pet 2 to pass through and for the anus 17' to exhaust waste. Then a string 1010 is provided around the hole 101 and an adjusting member 1011 is adhered to the string 1010 for adjusting the size of the hole 101 to suit to the size of the tail and the body and the location of the anus 17', possible to be hidden inside the band 11'.

The two lateral bands 12' respectively have the intermediate point connected with the lengthwise band 11' with a spaced distance in parallel, having an adjusting member 16' fitted around for adjusting the length of the lateral bands 11' so as to be bound most comfortably around the belly 22 of a pet 2 with various sizes and lengths and to keep the conservative band 1 from falling off the body of the pet 2. The lateral bands 12' are respectively provided with a pair of connecting members 15' at two ends, one 15' being a male and the other 15' being a female for engaging with each other for binding quickly. The connecting members 15' can be Velcro pieces to adhere with each other. Further, a V-shaped connect string 120 is fixed with the central point of the rear lateral band 12' where the lateral band 12' is tied with the rear end of the lengthwise band 11' having a hook 14' respectively connected with the two ends for hooking with the collar 13' put around the neck 23 of a pet 2 so the collar 13' may not rotate and also help securing the pet band 1. The collar 13' is provided with many holes 130 spaced apart almost equidistantly for the hooks 14' to hook with. If a common collar is used instead of the collar 13' in the invention, the hooks 14' can also hook it.

In general, the hygienic pet conservative band in the invention can improve negative problems that conventional pet bands have so as to keep a pet clean and hygienic.

The hygienic pet conservative band according to the invention has the following advantages.

1. It can prevent a pet from getting sexual ly coupled undesirably to avoid getting pregnant: As the patch can hide completely the sexual organ to prevent coupling unwanted.

2. It can reduce propagation of stray pets: As unwanted coupling can be prevented.

3. It can induce to avoid excessive social burdens and environment pollution: As it can be worn on a pet for preventing random coupling of pets by wild ones.

4. It can maintain hygienic the sexual organ of a pet not to be infected with bacteria: As it can hide the sexual organ from exposing to avoid infection.

5. It can prevent disease from infecting to an owner from a pet: As it keeps a pet from being too close to the owner, and thus stopping infection from the pet to the owner.

6. It can be worn on a pet with substantive comfort: As it has a cotton member possible to be added in the patch during the menstrual cycle of the pet.

7. It has fine ventilation: As a pet may have a thick fur, so its heat dissipation is important, and the patch and the cotton of a net structure can make the pet band quite ventilative when worn on a pet body.

8. It avoids dropping and pollution of excretion: If a pet wears this band whether in a room, outdoors or in car, the cotton member placed in the patch can absorb liquid waste, not let it drip down.

While the preferred embodiment of the invention has been described above, it will be recognized and understood that various modifications may be made therein and the appended claims are intended to cover all such modifications that may fall within the spirit and scope of the invention.

What is claimed is:

1. A hygienic pet conservative band for a pet comprising:
   a) a collar located around a neck of the pet;
   b) a patch being a net structure and having:
      i) a hole formed on a first end thereof adjacent to the net structure; and
      ii) an first adjusting member having a string and selectively adjusting a size of the hole;
   c) a lengthwise band having:
      i) a first portion having a first connective member connected to the first end of the patch; and
      ii) a second portion having a second connective member connected to a second end of the patch; and
   d) two lateral bands, each of the two lateral bands being connected at a mid-portion thereof to the lengthwise band and having:
      i) a pair of band connecting members connecting two opposing ends of each pair of band around a waist of the pet; and
      ii) two strings connected to the mid-portion of a rear most band of the two lateral bands, each of the two strings having a hook connected to a lower portion of the collar.

2. The hygienic pet conservative band according to claim 1, further comprising a cotton member located on an inner side of the net structure of the patch.

3. The hygienic pet conservative band according to claim 2, wherein the cotton member is a net material providing ventilation.

4. The hygienic pet conservative band according to claim 1, wherein the patch having a first patch connecting member located on the first end thereof and connected to the first connective member and a second patch connecting member located on the second end thereof and connected to the second connective member.

5. The hygienic pet conservative band according to claim 1, wherein the patch having a shape of a pair of pants.

6. The hygienic pet conservative band according to claim 1, wherein each of the first portion and the second portion of the lengthwise band and the two lateral bands has a band adjusting member selectively adjusting a length thereof.

7. The hygienic pet conservative band according to claim 1, wherein the collar having plurality of holes, the two hooks being connected to two holes of the plurality of holes along a length thereof.

* * * * *